(12) United States Patent
Tian et al.

(10) Patent No.: US 11,009,135 B2
(45) Date of Patent: May 18, 2021

(54) FOUR VALVE DISC FRICTIONLESS BALL VALVE

(71) Applicants: South China Company, China Oil & Gas pipeline Network corporation, Guangzhou (CN); Xi'an Aerospace Yuanzheng Fluid Control Co. Ltd, Xi'an (CN)

(72) Inventors: Zhongshan Tian, Guangzhou (CN); Jun Yuan, Xi'an (CN); Shaochuan Lai, Guangzhou (CN); Bo Wang, Xi'an (CN); Changqun Yang, Guangzhou (CN); Yulong Feng, Xi'an (CN); Long Zhong, Guangzhou (CN); Zhenning Yang, Xi'an (CN)

(73) Assignees: South China Company, China Oil & Gas pipeline Network corporation, Guangzhou (CN); Xi'an Aerospace Yuanzheng Fluid Control Co. Ltd, Xi'an (CN)

(*) Notice: Subject to any disclaimer, the term of this patent is extended or adjusted under 35 U.S.C. 154(b) by 0 days.

(21) Appl. No.: 16/741,746

(22) Filed: Jan. 14, 2020

(65) Prior Publication Data
US 2020/0240528 A1    Jul. 30, 2020

(30) Foreign Application Priority Data

Jan. 29, 2019 (CN) .......................... 201910084282.0

(51) Int. Cl.
F16K 5/06    (2006.01)
F16K 11/056  (2006.01)
F16K 5/20    (2006.01)

(52) U.S. Cl.
CPC ............ *F16K 5/0605* (2013.01); *F16K 5/204* (2013.01); *F16K 11/0565* (2013.01)

(58) Field of Classification Search
CPC ..... F16K 11/0565; F16K 5/204; F16K 5/0605
(Continued)

(56) References Cited

U.S. PATENT DOCUMENTS 2,531,759 A * 11/1950 Wolf ....................... F16K 5/204
                                                           251/163
3,323,537 A *  6/1967 Shafer .................. F16K 27/067
                                                        137/246.15

(Continued)

*Primary Examiner* — John Bastianelli
(74) *Attorney, Agent, or Firm* — Bayramoglu Law Offices LLC

(57) ABSTRACT

A four valve disc frictionless ball valve includes a spherical valve core assembly, wherein the spherical valve core assembly includes a wedge-shaped valve core. A closed-position valve disc is respectively installed on a pair of closed-position wedge-shaped sides. A closed-position guide key is respectively arranged at the middle positions of the pair of closed-position wedge-shaped sides along an axial direction. A closed-position guide groove is arranged on each closed-position valve disc along the axial direction. An open-position valve disc is respectively installed on a pair of open-position wedge-shaped sides. An open-position guide key is respectively arranged at the middle positions of the pair of open-position wedge-shaped sides along the axial direction. An open-position guide groove is arranged on each open-position valve disc along the axial direction.

8 Claims, 7 Drawing Sheets

(58) Field of Classification Search
USPC .............................. 251/161, 315.01–315.16
See application file for complete search history.

(56) References Cited

U.S. PATENT DOCUMENTS

| | | | | | |
|---|---|---|---|---|---|
| 3,406,943 | A | * | 10/1968 | Newell | ..................... F16K 5/00 |
| | | | | | 251/163 |
| 3,841,601 | A | * | 10/1974 | Grove | ................... F16K 5/0673 |
| | | | | | 251/315.09 |
| 5,137,258 | A | * | 8/1992 | Takamatsu | .............. F16K 5/204 |
| | | | | | 251/160 |
| 5,205,535 | A | * | 4/1993 | Nevrekar | ................ F16K 5/204 |
| | | | | | 251/161 |
| 5,265,845 | A | * | 11/1993 | Gilliam | ................... F16K 5/204 |
| | | | | | 251/163 |

\* cited by examiner

FOUR VALVE DISC FRICTIONLESS BALL VALVE

CROSS REFERENCE TO THE RELATED APPLICATIONS

This application is based upon and claims priority to Chinese Patent Application No. 201910084282.0, filed on Jan. 29, 2019, the entire contents of which are incorporated herein by reference.

TECHNICAL FIELD

The present disclosure pertains to the field of valves and ball valves, and more particularly, to a four valve disc frictionless ball valve.

BACKGROUND

Currently, ball valves are used in oil pipelines for switching oil products; and used with pig launchers and receivers, and at pig launching and receiving stations, etc. During the production process, the product sent through the pipeline contains a variety of impurities. During the course of ball valves opening and closing, the sealing surface is likely to be scratched by hard impurities due to the close contact of the valve body with the valve seat. Eventually resulting in seal failure and internal leakage of the ball valve.

The valve stem is prone to jamming during the opening and closing of the conventional ball valve. Therefore, the functional torque when in operation is large, and the valve core and the valve seat are abraded, which is likely to generate leakages, and results in poor operation.

Moreover, conventional ball valves cannot perform real-time leak detection during use. The valve must be removed from the pipeline to perform leak detection and maintenance when a failure has occurred, and thus the ability of conventional ball valves to do maintenance in real-time is poor, which makes use of conventional ball valves inconvenient.

SUMMARY

In view of the deficiencies of the prior art, the objective of the present invention is to provide a four valve disc frictionless ball valve, to solve the technical problem of the internal leakage of conventional ball valves.

In order to solve the above-mentioned technical problem, the present invention is achieved by using the following technical solutions:

A four valve disc frictionless ball valve includes a valve body. A spherical valve core assembly is installed in the valve body. A valve stem is installed on the spherical valve core assembly. The valve stem includes an upper valve stem and a lower valve stem that are arranged coaxially. An upper valve cover is installed on the upper portion of the valve body, and a lower valve cover is installed on the lower portion of the valve body.

The spherical valve core assembly includes a wedge-shaped valve core. One end of the upper valve stem is installed at the top of the wedge-shaped valve core. The other end of the upper valve stem passes through the upper valve cover and extends to the outside of the upper valve cover. One end of the lower valve stem is installed at the bottom of the wedge-shaped valve core, and the other end of the lower valve stem is installed in a lifting cavity of the lower valve cover.

A pair of oppositely arranged wedge-shaped sides of four sides of the wedge-shaped valve core are a pair of closed-position wedge-shaped sides. The other pair of oppositely arranged wedge-shaped sides of the four sides of the wedge-shaped valve core are a pair of open-position wedge-shaped sides. The closed-position wedge-shaped side is arranged adjacent to the open-position wedge-shaped side.

A closed-position valve disc is respectively installed on the pair of closed-position wedge-shaped sides. A closed-position guide key is respectively arranged at middle positions of the pair of closed-position wedge-shaped sides along the axial direction. A closed-position guide groove is arranged on each closed-position valve flap along the axial direction. The closed-position valve flap is installed on the closed-position wedge-shaped side by the closed-position guide key and the closed-position guide groove which are engaged with one another.

An open-position valve disc is respectively installed on the pair of open-position wedge-shaped sides. An open-position guide key is respectively arranged at the middle positions of the pair of open-position wedge-shaped sides along the axial direction. An open-position guide groove is arranged on each open-position valve disc along the axial direction. The open-position valve disc is installed on the open-position wedge-shaped side by the open-position guide key and the open-position guide groove which are engaged with one another.

The wedge-shaped valve core is provided with a wedge-shaped valve core flow channel which is radially formed and penetrates the pair of open-position wedge-shaped sides and the open-position guide key. The open-position valve disc is provided with a valve disc flow channel coaxially arranged corresponding to the wedge-shaped valve core flow channel. The valve body is provided with a valve body flow channel coaxially arranged corresponding to the wedge-shaped valve core flow channel.

The top of the closed-position valve disc and the top of the open-position valve disc each form a clearance fit with the upper valve cover. The bottom of the closed-position valve disc and the bottom of the open-position valve disc each form a clearance fit with the lower valve cover. The upper valve cover and the lower valve cover are configured to axially limit the closed-position valve disc and the open-position valve disc.

The closed-position valve disc is in sealing contact with an inner wall of the valve body around the valve body flow channel.

The present disclosure has the following distinguishing technical features:

A sealing rubber ring is arranged at a position where the closed-position valve disc contacts the inner wall of the valve body.

A shaft sleeve, a graphite filling layer, and a filling gland are successively arranged from the inside to the outside between the upper valve cover and the upper valve stem. A shaft sleeve is arranged between the lifting cavity and the lower valve stem.

A sealing gasket and an O-shaped sealing ring are arranged between the upper valve cover and the valve body. A sealing gasket and an O-shaped sealing ring are arranged between the lower valve cover and the valve body.

The valve body is provided with a plurality of detection holes.

A positioning hole is arranged on the upper portion of the closed-position valve disc.

The lower valve cover is provided with a drain hole penetrating the lower valve cover, and a drain valve is installed on the drain hole.

A collecting deflector is installed on the upper surface of the lower valve cover. The upper surface of the collecting deflector is an inclined surface. The lower portion of the inclined surface on the upper surface of the collecting deflector is connected to the drain hole.

Compared with the prior art, the present invention has the following advantages.

(1) The ball valve of the present invention can realize frictionless opening and closing, and the wedge-shaped valve core is matched with the four valve disc structure to ensure that the valve can be bidirectionally sealed without leakage, and can be opened and closed in a frictionless manner, which eliminates seal wear and greatly increases the service life of the valve.

(2) When the ball valve of the present invention is fully opened, the sealing structure of the ball valve can effectively prevent particulate impurities in the oil medium from entering the inner cavity of the valve body and damaging the sealing surface, which overcomes the deficiency that the sealing surface of the conventional pigging ball valve is easily damaged and improves the operational reliability and the service life of the valve.

(3) When the ball valve of the present invention rotates, the valve disc is separated from the inner wall of the valve body, so that the operating torque is small when the plug cock rotates, which is suitable for occasions with frequent operations.

Figure 1:
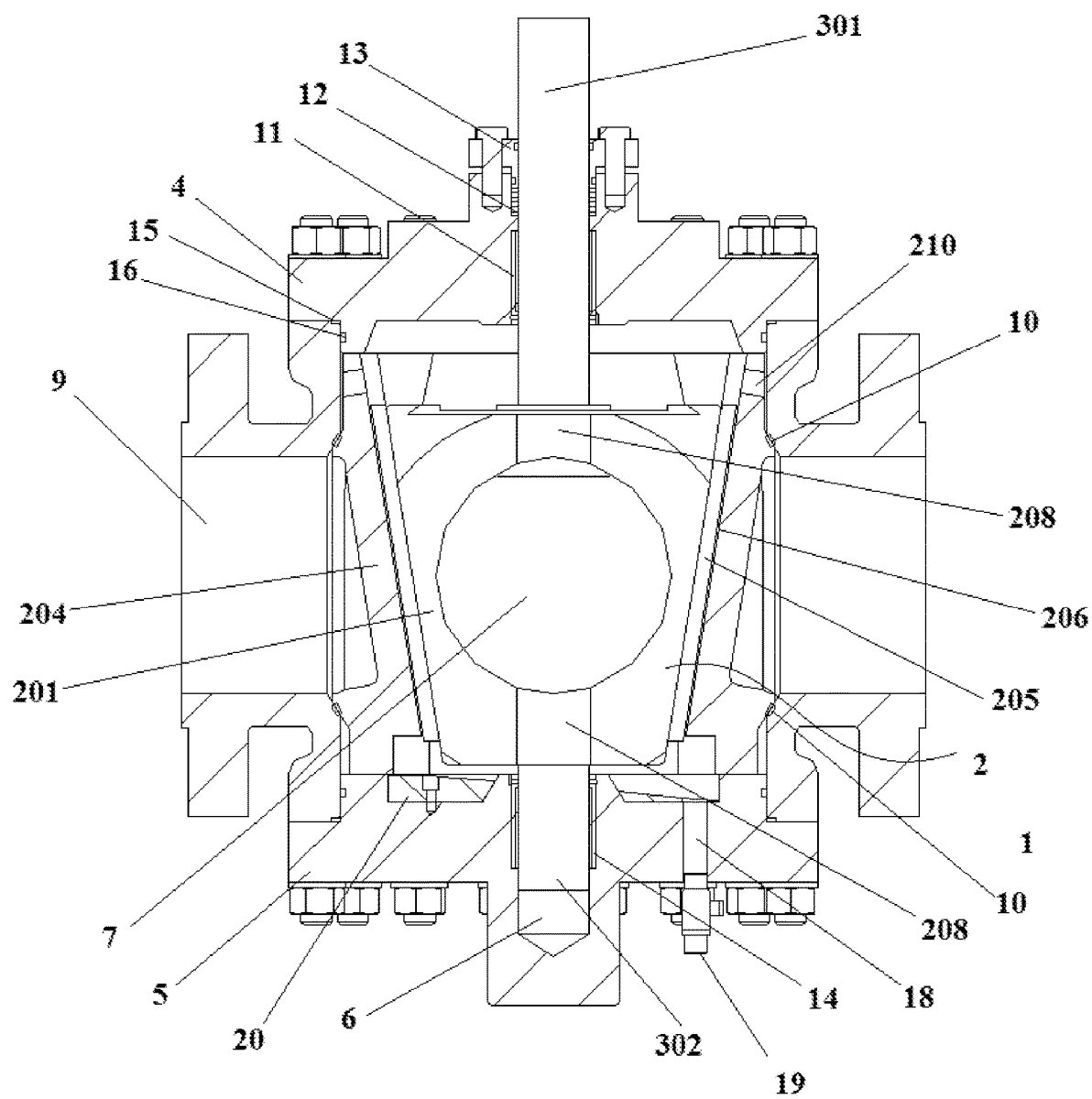
FIG. 1 is a structural schematic diagram of a front cross-sectional view showing the closed-position state of the present invention, i.e., a cross-sectional view of the section A-A of FIG. 7.

The definition of each reference numeral in the drawings is as follow: 1—valve body, 2—spherical valve core assembly, 3—valve stem, 4—upper valve cover, 5—lower valve cover, 6—lifting cavity, 7—wedge-shaped valve core flow channel, 8—valve disc flow channel, 9—valve body flow channel, 10—sealing rubber ring, 11—upper shaft sleeve, 12—graphite filling layer, 13—filling gland, 14—lower shaft sleeve, 15—sealing gasket, 16—O-shaped sealing ring, 17—detection hole, 18—drain hole, 19—drain valve, 20—collecting deflector;

201—wedge-shaped valve core, 202—closed-position wedge-shaped side, 203—open-position wedge-shaped side, 204—closed-position valve disc, 205—closed-position guide key, 206—closed-position guide groove, 207—open-position valve disc, 208—open-position guide key, 209—open-position guide groove, 210—positioning hole; and 301—upper valve stem, 302—lower valve stem.

The specific content of the present invention will be further explained and described with reference to the following embodiments.

DETAILED DESCRIPTION OF THE EMBODIMENTS

The ball valve of the present invention can be opened and closed without friction.

The valve has the advantages of having a good flow capacity, a strong anti-fouling capacity, and a leakage-free operation both inside and outside the valve. Moreover, the valve can be monitored in real time, has a reliable drainage structure, the operation requires less torque, and has excellent sealing reliability, which is suitable for strict sealing requirements. The ball valve of the present invention can be widely used for conveying and switching oil products, used with pig launchers and receivers, and at pig launching and receiving stations, and other occasions in long-distance pipelines in the petrochemical industry.

Figure 2:
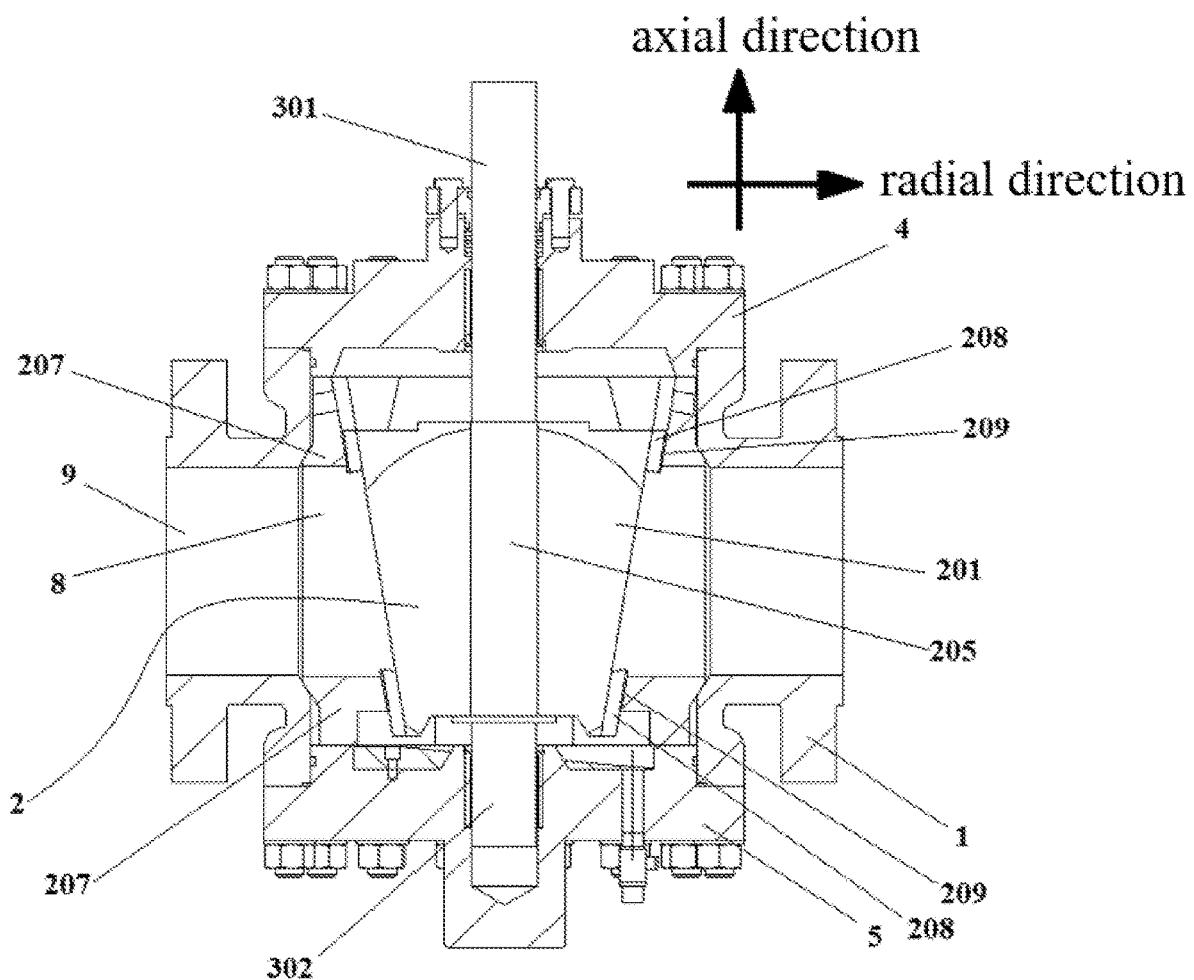
FIG. 2 is a structural schematic diagram of a front cross-sectional view showing the open-position state of the present invention.

It should be noted that in the cross-sectional views of FIGS. 1-2, the wedge-shaped valve core and the valve stem are not sectioned, and thus, there is no corresponding section lines.

Based on the above-mentioned technical solutions, the specific embodiments of the present invention will be described hereinafter. It should be noted that the present invention is not limited to the following embodiments, and any equivalent variations made on the basis of the technical solutions of the present invention would fall within the scope of protection of the present invention.

Embodiment 1

The present embodiment provides a four valve disc frictionless ball valve, as shown in FIGS. 1-7, including the valve body 1. The spherical valve core assembly 2 is installed in the valve body 1. The valve stem 3 is installed on the spherical valve core assembly 2. The valve stem 3 includes the upper valve stem 301 and the lower valve stem 302 which are arranged coaxially. The upper valve cover 4 is installed on the upper portion of the valve body 1, and the lower valve cover 5 is installed on the lower portion of the valve body 1.

The spherical valve core assembly 2 includes the wedge-shaped valve core 201. One end of the upper valve stem 301 is installed at the top of the wedge-shaped valve core 201. The other end of the upper valve stem 301 passes through the upper valve cover 4 and extends to the outside of the upper valve cover 4. One end of the lower valve stem 302 is installed at the bottom of the wedge-shaped valve core 201, and the other end of the lower valve stem 302 is installed in the lifting cavity 6 of the lower valve cover 5.

A pair of oppositely arranged wedge-shaped sides among four sides of the wedge-shaped valve core 201 are the pair of closed-position wedge-shaped sides 202. The other pair of oppositely arranged wedge-shaped sides among the four sides of the wedge-shaped valve core 201 are the pair of open-position wedge-shaped sides 203. The closed-position wedge-shaped side 202 is arranged adjacent to the open-position wedge-shaped side 203.

The closed-position valve disc 204 is respectively installed on the pair of closed-position wedge-shaped sides 202. The closed-position guide key 205 is respectively arranged at the middle positions of the pair of closed-position wedge-shaped sides 202 along the axial direction. The closed-position guide groove 206 is arranged on each closed-position valve disc 204 along the axial direction. The closed-position valve disc 204 is installed on the closed-position wedge-shaped side 202 by the closed-position guide key 205 and the closed-position guide groove 206 which are engaged with one another.

The open-position valve disc 207 is respectively installed on the pair of open-position wedge-shaped sides 203. The open-position guide key 208 is respectively arranged at the middle positions of the pair of open-position wedge-shaped sides 203 along the axial direction. The open-position guide groove 209 is arranged on each open-position valve disc 207 along the axial direction. The open-position valve disc 207 is installed on the open-position wedge-shaped side 203 by the open-position guide key 208 and the open-position guide groove 209 which are engaged with one another.

The wedge-shaped valve core 201 is provided with the wedge-shaped valve core flow channel 7 which is radially formed and penetrates the pair of open-position wedge-shaped sides 203 and the open-position guide key 208. The open-position valve disc 207 is provided with the valve disc flow channel 8 coaxially arranged corresponding to the wedge-shaped valve core flow channel 7. The valve body 1 is provided with the valve body flow channel 9 coaxially arranged corresponding to the wedge-shaped valve core flow channel 7.

The top of the closed-position valve disc 204 and the top of the open-position valve disc 207 each form a clearance fit with the upper valve cover 4. The bottom of the closed-position valve disc 204 and the bottom of the open-position valve disc 207 each form a clearance fit with the lower valve cover 5. The upper valve cover 4 and the lower valve cover 5 are configured to axially limit the closed-position valve disc 204 and the open-position valve disc 207. The clearance fit can ensure that the valve disc is axially limited, and can also ensure that the valve disc has a sufficient movement allowance during the radial contraction and extension process when driven by the wedge-shaped valve core 201, so as to avoid the jamming situation.

The closed-position valve disc 204 is in sealing contact with an inner wall of the valve body 1 around the valve body flow channel 9.

In the present embodiment, the inner cavity of the valve body 1 is spherical, and the four sealing valve discs have spherical structures.

In the present embodiment, the closed-position guide key 205, the closed-position guide groove 206, the open-position guide key 208, and the open-position guide groove 209 all include a dovetail structure, i.e., a dovetail groove or a dovetail key, so as to ensure the stability during a relative movement.

In a preferred solution of the present embodiment, the sealing rubber ring 10 is arranged at the position where the closed-position valve disc 204 contacts the inner wall of the valve body 1, so as to ensure the sealing performance between the spherical valve core assembly 2 and the inner wall of the valve body 1.

In a preferred solution of the present embodiment, the upper shaft sleeve 11, the graphite filling layer 12, and the filling gland 13 are successively arranged between the upper valve cover 4 and the upper valve stem 301 from the inside to the outside. The lower shaft sleeve 14 is arranged between the lifting cavity 6 and the lower valve stem 302, which ensures sealing when the upper valve stem 301 moves up and down on the upper valve cover 4.

In a preferred solution of the present embodiment, the sealing gasket 15 and the O-shaped sealing ring 16 are arranged between the upper valve cover 4 and the valve body 1. The sealing gasket 15 and the O-shaped sealing ring 16 are arranged between the lower valve cover 5 and the valve body 1.

In a preferred solution of the present embodiment, the valve body 1 is provided with the plurality of detection holes 17. The detection holes 17 are distributed in the middle position of the valve body 1 and the positions of the valve body flow passages 9 at both ends. Various parameters are detected in the valve body under a required working condition, such as the real-time leak detection on the valve, and the valve can be sealed and plugged when not in use. Alternatively, the valve body 1 is not provided with the detection hole 17 according to specific working conditions.

In a preferred solution of the present embodiment, the positioning hole 210 is arranged on the upper portion of the closed-position valve disc 204. The positioning hole 210 is used for positioning when the sealing rubber ring 10 is installed, which facilitates installation.

In a preferred solution of the present embodiment, the lower valve cover 5 is provided with the drain hole 18 penetrating the lower valve cover, and the drain valve 19 is installed on the drain hole 18. The collecting deflector 20 is installed on the upper surface of the lower valve cover 5. The upper surface of the collecting deflector 20 is an inclined surface. The lower portion of the inclined surface on the upper surface of the collecting deflector 20 is connected to the drain hole 18. The collecting deflector 20 is generally fixed by bolts. The collecting deflector 20 can gather and collect sewage to the drain hole 18, and periodically open the drain valve 19 to discharge the sewage.

The working process of the four valve disc frictionless ball valve of the present invention is as follows.

Figure 3:
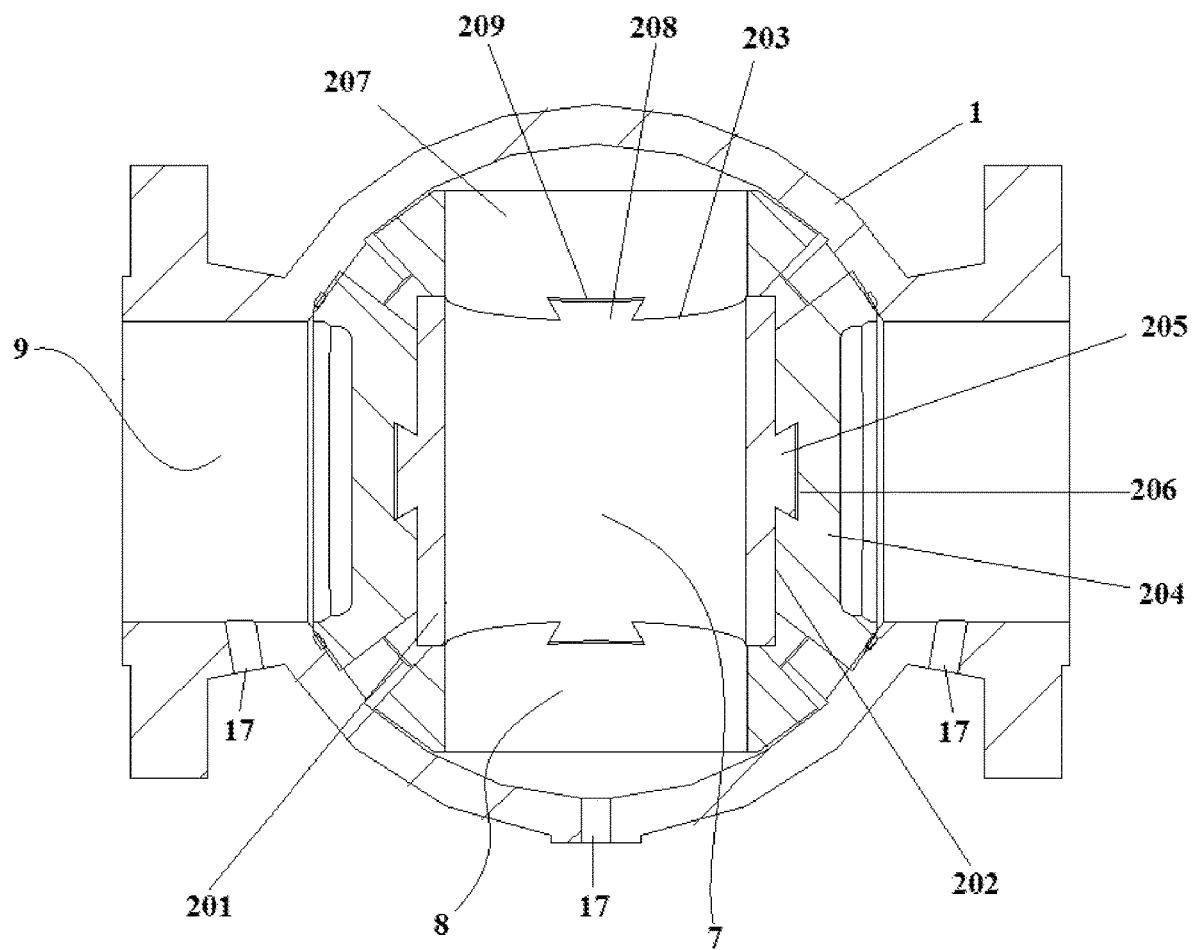
FIG. 3 is a structural schematic diagram of a top cross-sectional view showing the closed-position state of the present invention, i.e., a cross-sectional view of the section B-B of FIG. 5.
Figure 4:
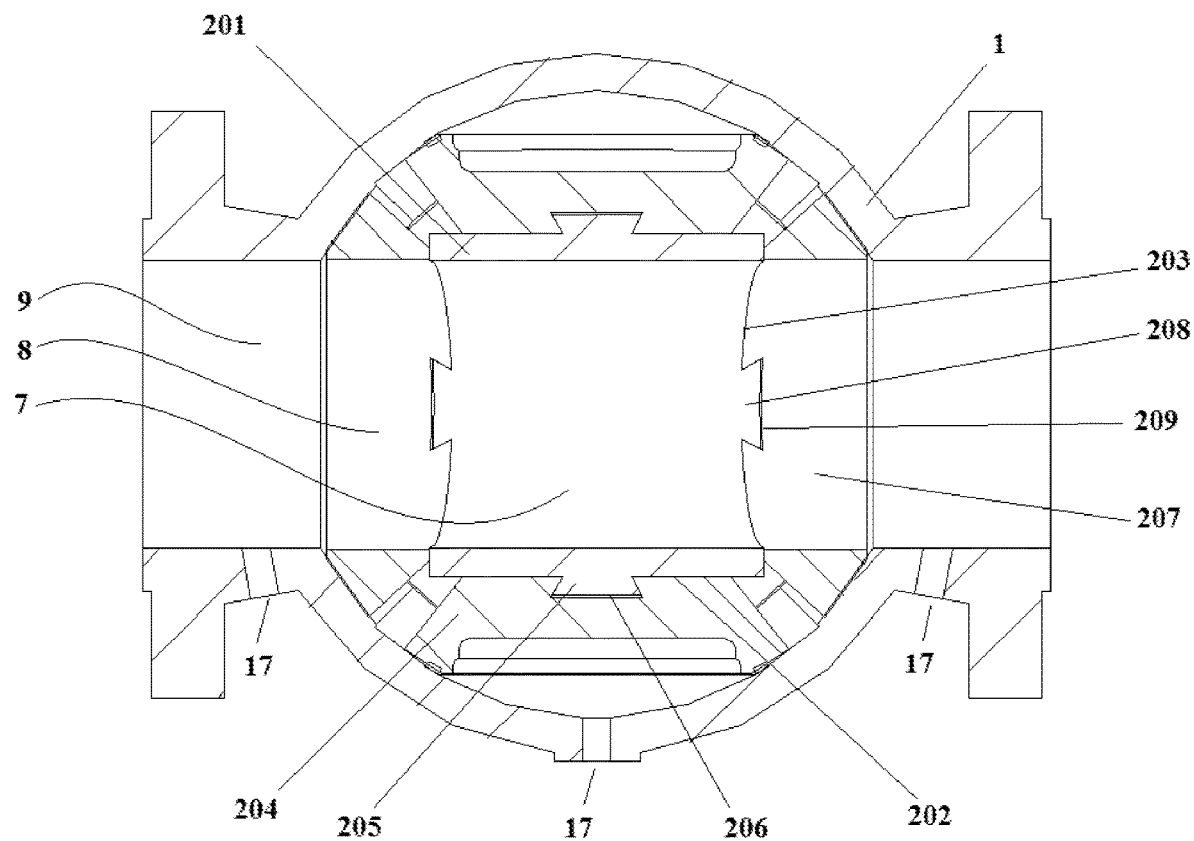
FIG. 4 is a structural schematic diagram of a top cross-sectional view showing the open-position state of the present invention.
Figure 5:
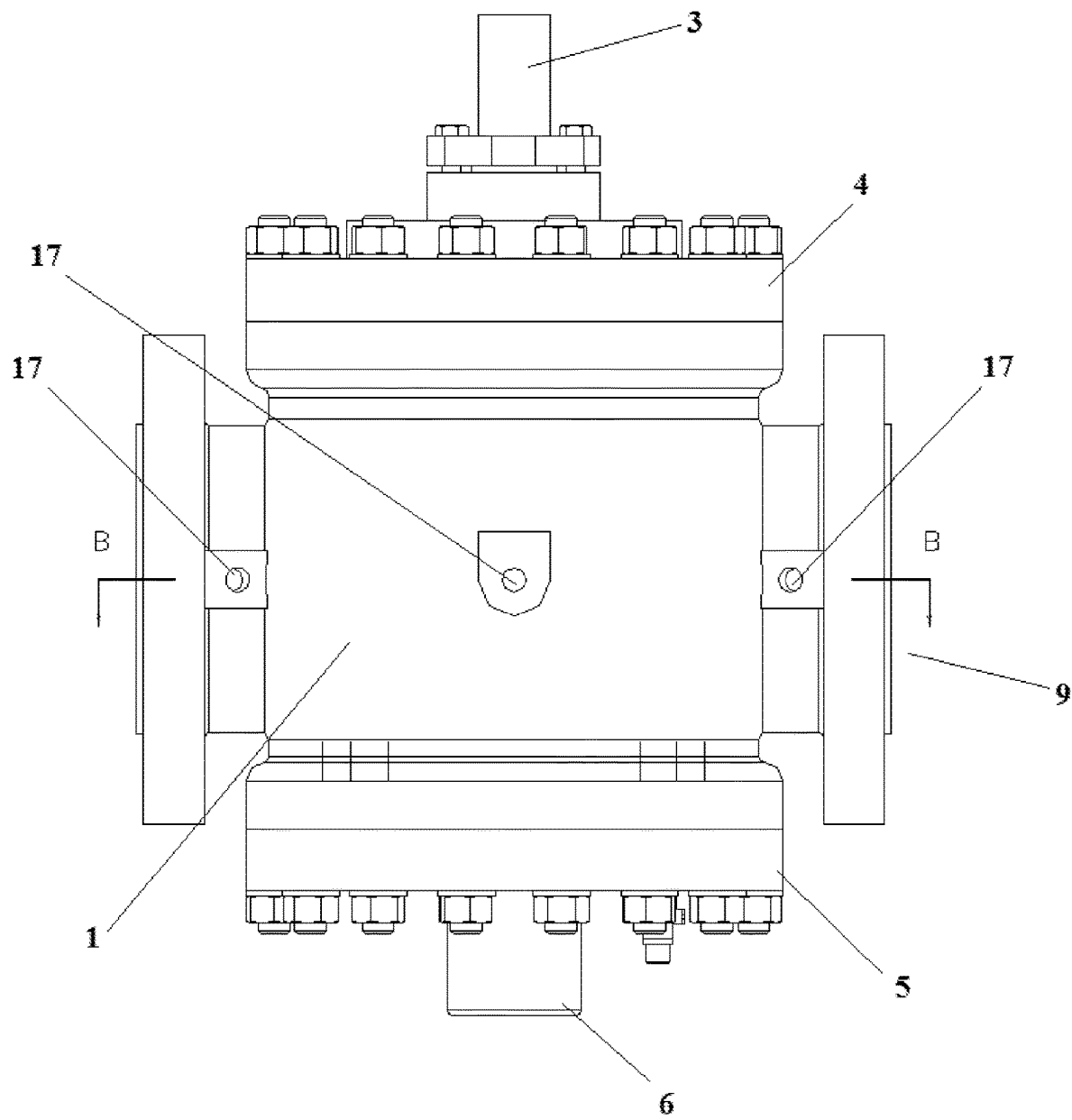
FIG. 5 is a structural schematic diagram of a front elevation view of the present invention.
Figure 6:
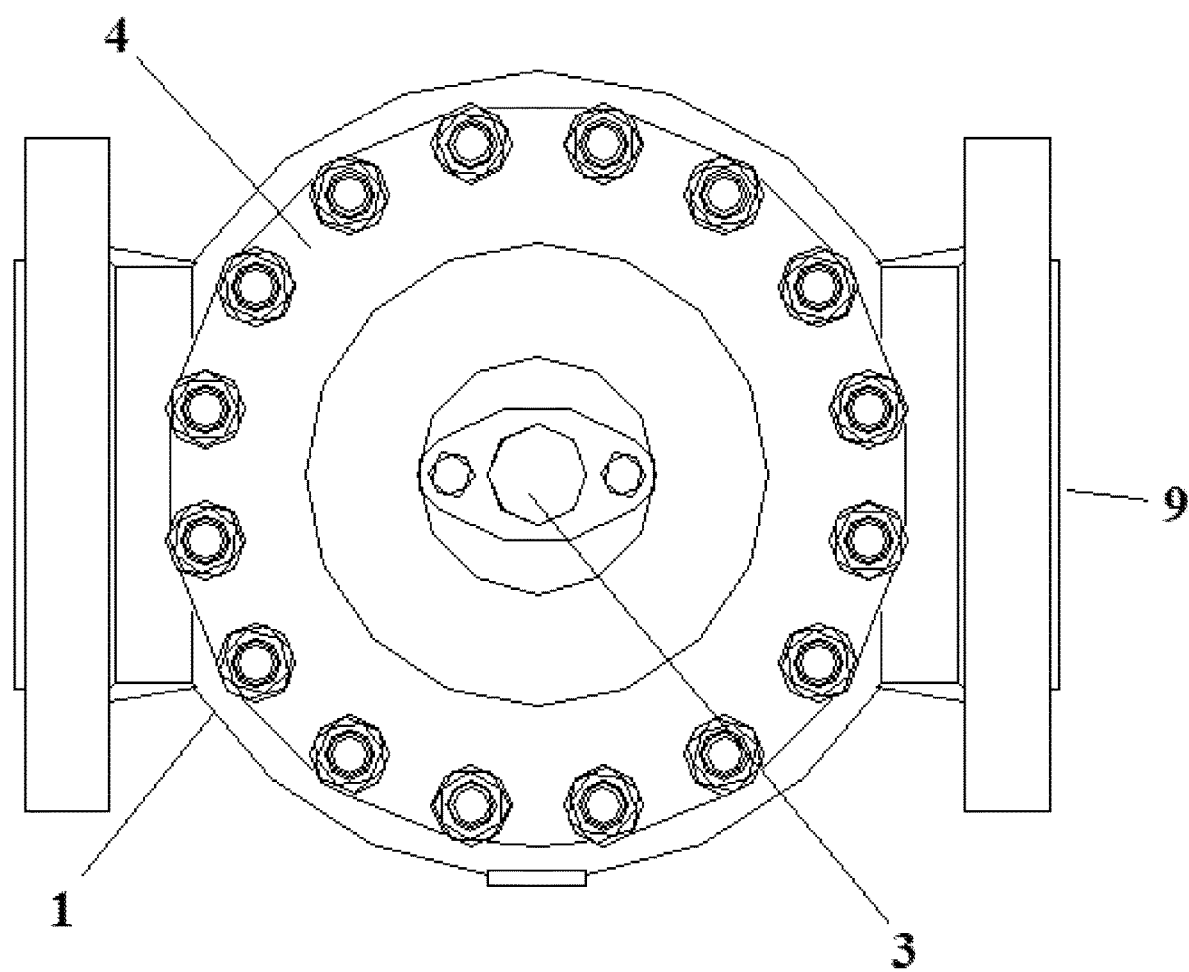
FIG. 6 is a structural schematic diagram of a top plan view of the present invention.
Figure 7:
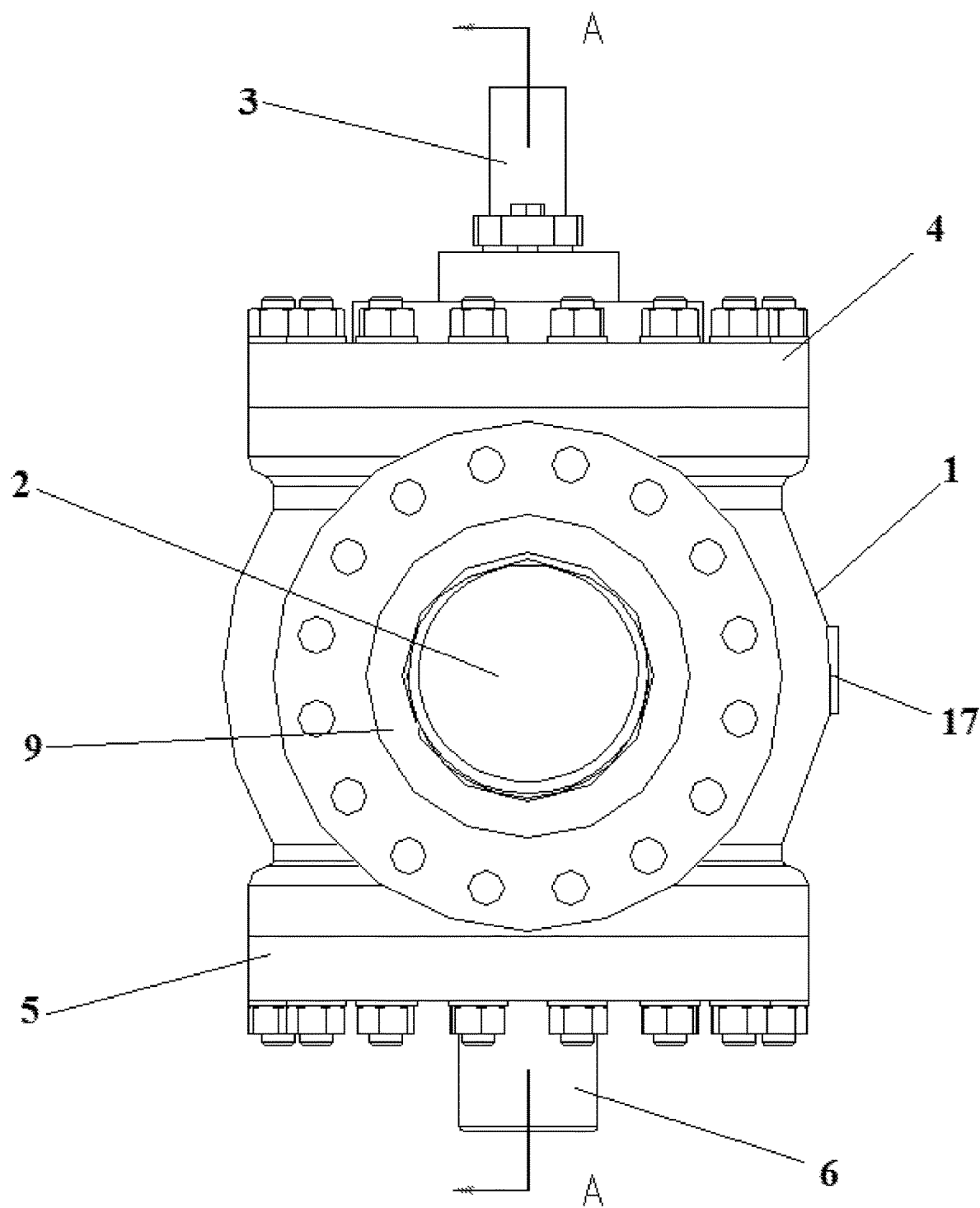
FIG. 7 is a structural schematic diagram of a side elevation view of the present invention.

As shown in FIG. 1 and FIG. 3, the closed-position valve disc 204 completely fits with the sealing surface of the inner wall of the valve body 1 at the inlet and outlet of the valve body flow channel 9, and at this time the valve is in a fully closed state. The manipulator drives the upper valve stem 301 to lift the wedge-shaped valve core 201 in the spherical valve core assembly 2, drives the closed-position valve discs 204 and the open-position disc valve 207 to retract radially, so that the closed-position valve disc 204 and the open-position valve discs 207 are disengaged from the inner cavity of the valve body 1. When the closed-position valve discs 204 and the open-position valve discs 207 are not in contact with the valve body 1, the closed-position valve discs 204 and the open-position valve discs 207 are rotated by 90°, so that the wedge-shaped valve core flow channel 7 and the valve disc flow channel 8 are radially aligned with the valve body flow channel 9. The height of the wedge-shaped valve core flow channel 7 in the vertical direction is higher than the height of the valve disc flow channel 8 and the valve body flow channel 9 in the vertical direction. After that, the manipulator drives the wedge-shaped valve core 201 to move downward. The open-position valve disc 207 is pushed outward by the wedge-shaped valve core 201 to fit with the sealing surface of the inner cavity of the valve body 1, and is sealed by a sealing member. At this time, the wedge-shaped valve core flow channel 7, the valve disc flow channel 8, and the valve body flow channel 9 are aligned in the radial direction and in the axial direction, i.e., fully aligned, and the valve is fully opened, as shown in FIG. 2 and FIG. 4. In this way, impurity particles in the medium cannot enter the inner cavity of the valve body 1, so the valve has a good medium anti-fouling ability.

During the ascending and descending process of the wedge-shaped valve core 201, the upper valve cover 4 and the lower valve cover 5 axially limit the closed-position valve disc 204 and the open-position valve disc 207. The axial movement of the wedge-shaped valve core 201 drives the four valve discs to retract radially or expand outward by the closed-position guide key 205 and the closed-position guide groove 206 which are engaged with one another and by the open-position guide key 208 and the open-position guide groove 209 which are engaged with one another, so as to separate and seal the valve disc and the valve body 1.

Similarly, when the valve is fully open, the driving mechanism of the manipulator rotates reversely, the wedge-shaped valve core 201 is driven by the manipulator to lift upward, and the closed-position valve discs 204 and the open-position valve discs 207 are contracted, so that the open-position valve disc 207 moves away from the valve body 1. Then, the wedge-shaped valve core 201 drives the four valve discs to rotate 90° in reverse when the sealing member is not in contact with the valve body 1. At this time, the closed-position valve disc 204 is aligned with the inlet and outlet of the valve body flow channel 9, and the wedge-shaped valve core 201 is driven by the manipulator to move downward. The closed-position valve disc 204 is pushed outward by the wedge-shaped valve core 201 to fit with the sealing surface of the valve body 1, and is sealed by the sealing member. In this way, the upper stream and the lower stream are cut off to achieve a bidirectional zero leakage sealing of the valve.

The four valve disc frictionless ball valve can replace the conventional pigging ball valve used in the long-distance pipelines by using the above-mentioned working principle. When a pigging operation is performed, the ball valve in pig launchers and receivers cab be open and closed in a frictionless manner, which is convenient and reliable, and greatly improves the service life of the valve.

What is claimed is:

1. A four valve disc frictionless ball valve, comprising a valve body;
    a spherical valve core assembly, installed in the valve body;
    a valve stem, installed on the spherical valve core assembly, wherein the valve stem comprises an upper valve stem and a lower valve stem, wherein the upper valve stem and the lower valve stem are arranged coaxially;
    an upper valve cover, installed on an upper portion of the valve body; and
    a lower valve cover, installed on a lower portion of the valve body; wherein:
    the spherical valve core assembly comprises a wedge-shaped valve core; a first end of the upper valve stem is installed at a top of the wedge-shaped valve core, and a second end of the upper valve stem passes through the upper valve cover and extends to an outside of the upper valve cover; a first end of the lower valve stem is installed at a bottom of the wedge-shaped valve core, and a second end of the lower valve stem is installed in a lifting cavity of the lower valve cover;
    a first pair of oppositely arranged wedge-shaped sides among four sides of the wedge-shaped valve core are a pair of closed-position wedge-shaped sides, and a second pair of oppositely arranged wedge-shaped sides among the four sides of the wedge-shaped valve core are a pair of open-position wedge-shaped sides; each of the pair of closed-position wedge-shaped sides are arranged adjacent to each of the pair of open-position wedge-shaped sides;
    a closed-position valve disc is installed on each of the pair of closed-position wedge-shaped sides; a closed-position guide key is respectively arranged at middle positions of each of the pair of closed-position wedge-shaped sides along an axial direction; a closed-position guide groove is arranged on each closed-position valve disc along the axial direction; the closed-position valve disc is installed on each of the pair of closed-position wedge-shaped side by engaging the closed-position guide key with the closed-position guide groove;
    an open-position valve disc is installed on each of the pair of open-position wedge-shaped sides; an open-position guide key is respectively arranged at middle positions of each of the pair of open-position wedge-shaped sides along the axial direction; an open-position guide groove is arranged on each open-position valve disc along the axial direction; the open-position valve disc is installed on each of the pair of open-position wedge-shaped side by engaging the open-position guide key with the open-position guide groove;
    the wedge-shaped valve core is provided with a wedge-shaped valve core flow channel, wherein the wedge-shaped valve core flow channel is radially formed and penetrates the pair of open-position wedge-shaped sides and the open-position guide key; the open-position valve disc is provided with a valve disc flow channel, wherein the valve disc flow channel is coaxially arranged corresponding to the wedge-shaped valve core flow channel; the valve body is provided with a valve body flow channel, wherein the valve body flow channel is coaxially arranged corresponding to the wedge-shaped valve core flow channel;
    a top of the closed-position valve disc and a top of the open-position valve disc each form a clearance fit with the upper valve cover; a bottom of the closed-position valve disc and a bottom of the open-position valve disc each form a clearance fit with the lower valve cover; the upper valve cover and the lower valve cover are configured to axially limit the closed-position valve disc and the open-position valve disc; and
    the closed-position valve disc is in sealing contact with an inner wall of the valve body around the valve body flow channel.

2. The four valve disc frictionless ball valve according to claim 1, wherein, a sealing rubber ring is arranged at a position, wherein the closed-position valve disc contacts the inner wall of the valve body at the position.

3. The four valve disc frictionless ball valve according to claim 1, wherein, a upper shaft sleeve, a graphite filling layer, and a filling gland are successively arranged from inside to outside between the upper valve cover and the upper valve stem; a lower shaft sleeve is arranged between the lifting cavity and the lower valve stem.

4. The four valve disc frictionless ball valve according to claim 1, wherein, a sealing gasket and an O-shaped sealing ring are arranged between the upper valve cover and the valve body; the sealing gasket and the O-shaped sealing ring are arranged between the lower valve cover and the valve body.

5. The four valve disc frictionless ball valve according to claim 1, wherein, the valve body is provided with a plurality of detection holes.

6. The four valve disc frictionless ball valve according to claim 1, wherein, a positioning hole is arranged on an upper portion of the closed-position valve disc.

7. The four valve disc frictionless ball valve according to claim 1, wherein, the lower valve cover is provided with a drain hole penetrating the lower valve cover, and a drain valve is installed on the drain hole.

8. The four valve disc frictionless ball valve according to claim 7, wherein, a collecting deflector is installed on an upper surface of the lower valve cover; an upper surface of the collecting deflector is an inclined surface; a lower portion of the inclined surface on the upper surface of the collecting deflector is connected to the drain hole.

* * * * *